June 22, 1965 W. G. WADEY 3,191,008

TABULATING CARD POSITION SENSING DEVICE

Filed April 11, 1962

INVENTOR
WALTER G. WADEY

BY Edward M. Farrell
ATTORNEY

United States Patent Office 3,191,008
Patented June 22, 1965

3,191,008

TABULATING CARD POSITION SENSING DEVICE

Walter G. Wadey, Wynnewood, Pa., assignor to Sperry Rand Corporation, New York, N.Y., a corporation of Delaware Filed Apr. 11, 1962, Ser. No. 186,706
4 Claims. (Cl. 235—61.11)

Figure 1:
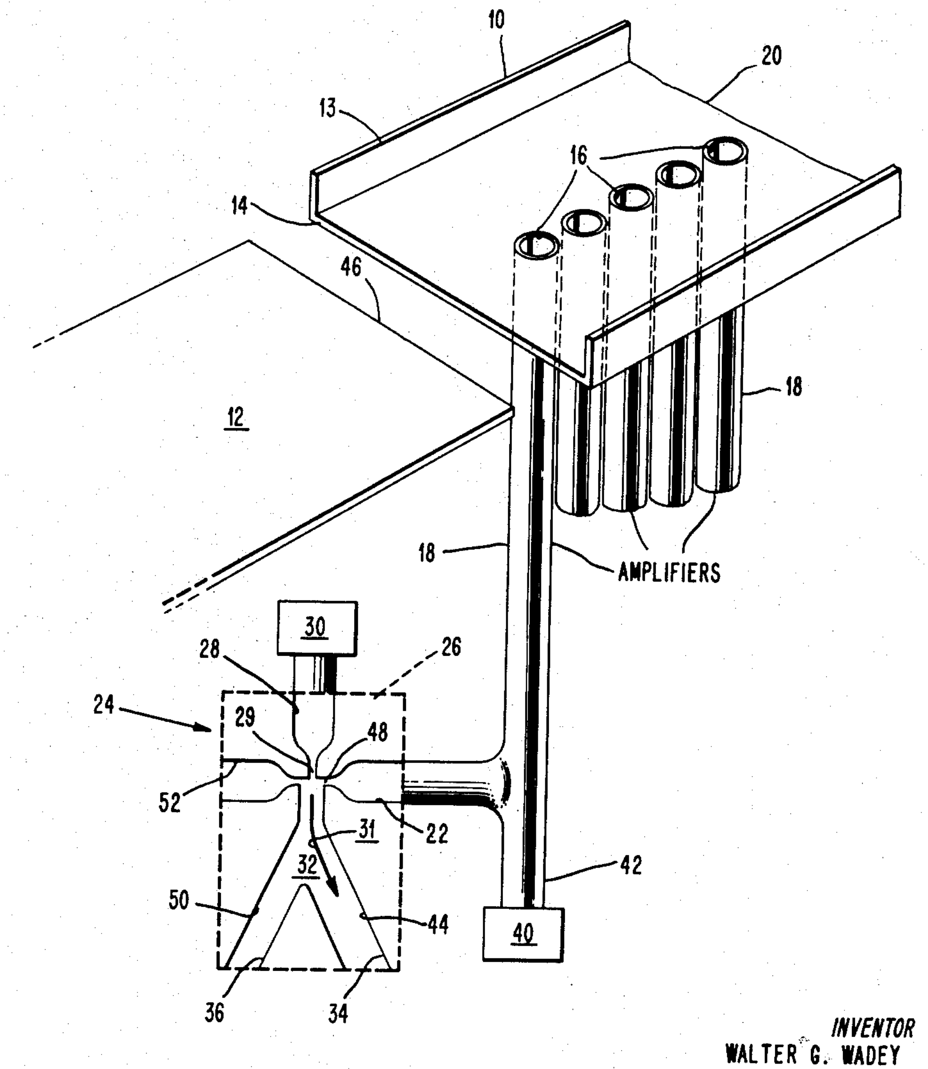

This invention relates to record handling apparatus of the type used in data processing systems. More particularly, the invention relates to a device operative on fluid principles for sensing the position of a tabulating card as it is being processed.

In the operation of electronic computers, tabulating cards may be used to carry information in the form of perforations or other marks. As the card is processed, i.e. is fed through a suitable device to receive such information therefrom (encoding process), or to present its information for reading thereby (decoding or sensing process), it is important that the position of the card in the device be detectable at any instant, since only when the card is accurately positioned may the encoding devices be activated or the sensing devices become active.

Position sensing devices for cards are well known in the art. They rely generally on mechanical or photoelectric means. The application of mechanical devices is restricted, however, since they are slow, subject to wear and soon become quite complex. The reliability of photoelectric devices is influenced by environmental conditions such as vibration and temperature.

It is accordingly an object of the invention to provide a record position sensing device which may be reliably operated at high speeds.

It is a further object of the invention to provide a record position sensing device having no moving parts.

It is still a further object of the invention to provide a record position sensing device operative on fluid principles.

The record position sensing device according to the invention comprises a set of fluid conduits with their openings arranged in succession along the path of travel of a record, each conduit being connected to a fluid amplifier. When a record passes over an opening, the resulting fluid pressure variation in the pertaining conduit causes the fluid amplifier associated therewith to switch and initiate a desired work function such as punching or reading information into or from a card.

Further objects and advantages will be more readily understood from the following description and the accompanying drawing in which:

FIG. 1 illustrates a perspective view of a device embodying the invention.

Referring to the drawing, a card support 10 is shown adapted to support and guide a card 12, for example a tabulating card. The card support may be part of a card processor, i.e. a device in a data processing system in which the encoding and decoding of the cards takes place, while they are moved through the processor. During processing, the card 12 is supported by the support means 10 while moving over its bottom 14. Edges 13 of the support means 10 guide the card 12 during their movement. The bottom 14 is provided with a number of openings 16 arranged in succession along the longitudinal axis of the support means. Into each opening 16 there is inserted a tube 18 such that the end of the tube is flush with the top plane 20 of the bottom 14. The other end of each tube 18 is connected to a control inlet 22 of a fluid amplifier such as 24. Only one amplifier is illustrated in the figure since all amplifiers connected to the tubes 18 may be of the same type.

Although the openings 16 are illustrated as having circular cross section, it is to be understood that the cross section may be of any known geometrical form. It is further understood that the openings 16 need not be arranged as shown, in succession and along the longitudinal axis of the support means 10, but that they may be arranged in any desired pattern in the bottom of the support means.

The fluid amplifier 24 is of a type well known in the art of fluid devices. The amplifier 24 is generally comprised of the interconnected fluid ducts within the dashed rectangle 26. The inlet duct 28 of amplifier 24 is connected to a source of fluid under pressure 30. The fluid under pressure may be of gaseous nature, and is usually air. The fluid under pressure in inlet duct 28 issues through orifice 29 as a powerstream 31 into interaction chamber 32 of the amplifier. Chamber 32 is provided with two outlet ducts 34 and 36. The control signal inlet 22 is connected with one end of tube 18. Tube 18 is further connected with a source of control fluid under pressure 40 via tube 42.

In the quiescent state of the amplifier 24, the control fluid supplied to tube 18 escapes through opening 16 in the bottom of support 10. Further in the quiescent state of the amplifier 24, the fluid power stream 31, issuing from orifice 29 is locked against the wall 44 of the interaction chamber 32 and flows out of outlet 34. The outlet 34 may be connected through a return conduit to the low pressure side of the fluid system. If so desired, the outlet 34 may be extended by a conduit to a location where a work function is to be performed. For example, the outlet 34 may be connected to a control system to produce a signal, indicating that the card 12 should be stopped or continue its progress through the processor.

While progressing through the support 10, as soon as the leading edge 46 of the card 12 starts to close off the opening 16 of tube 18, the pressure in tube 18 starts to increase since fluid supplied from source 40 no longer can escape at the same rate through hole 16. When tube 18 is closed off completely by the card, i.e. when the leading edge 46 of the card has passed the opening 16, the pressure in tube 18 increases rapidly. The increased pressure adjacent the control orifice 48 influences the stability of the power stream 31 and causes the power stream to leave wall 44 and to switch to outlet 36 where it locks onto wall 50. The power stream now exits through outlet 36 of the amplifier. The power stream leaving outlet 36 may be used to perform a work function, for example, to produce a signal which initiates the operation of a card perforating mechanism or a card reading mechanism.

The amplifier 24 may be provided with a second control signal inlet 52 for resetting the amplifier to its quiescent state after the said work function has been performed.

From the foregoing it will be clear that the invention provides a card position sensing device which has no moving parts and which is extremely reliable in operation. Also its simple construction provides for an inexpensive and easily maintainable device.

While there have been illustrated and described the fundamental novel fatures of the invention as applied to a preferred embodiment thereof, it will be understood that various omissions and substitutions and changes in the form and details of the device illustrated and in its operation may be made by those skilled in the art, without departing from the spirit of the invention.

More specifically, the device as described and shown is not necessarily restricted to the use of a record medium in the form of a tabulating card. Tape, for example, a magnetic tape may be used. Perforations may be provided in the tape at suitable locations and these perforations may function in a manner similar to the leading edge of a card as described. During the processing of the tape, such perforations may establish selectively and temporarily communication between one or more conduits and the surrounding atmosphere causing pressure variations in the conduits to cause switching of the pertaining amplifiers.

Further, the fluid amplifier 24 may be of a different type than shown and described herein. The specific application of the device will determine the type of amplifier used. Further, whereas in the embodiment described and shown in the drawing a tube 18 is used to connect the opening 16 with the fluid amplifier 24, it will be understood that the tube may be omitted if the amplifier is placed with respect to the openings 16 such that fluid communication between these openings and the control fluid inlet 38 of the amplifier is assured. Thus, the amplifier 24 may be placed against and connected to the bottom of the support 10 or may even be placed in spaced relationship thereto, with control inlet 38 of the amplifier substantially in alignment with an opening 16.

The embodiments of the invention in which an exclusive property or privilege is claimed are defined as follows:

1. A record position sensing mechanism comprising a support adapted to support and guide said record while traveling thereon, said support including at least one aperture, said aperture being disposed in the path of travel of said record, a fluid amplifier having an input channel, first and second output channels, a source of power fluid connected to said input channel normally directing a power stream through said first output channel, means connected between said aperture and said fluid amplifier responsive to said record covering said aperture to switch said power stream from said first to said second output channel.

2. A data handling system including a record processor, a record position sensing device associated with said processor, said position sensing device comprising support means adapted to support and guide said record while being processed in said processor, said support means including a plurality of apertures longitudinally aligned in the path of movement of said record, a plurality of fluid amplifiers, each of said fluid amplifiers comprising, an input channel, a pair of output channels, a source of power fluid directing a power stream through one of said output channels, means connected between respective ones of said apertures and said fluid amplifiers responsive to said record covering said apertures to switch the power stream in the associated fluid amplifier to the other of said output channels.

3. A data handling system including a tabulating card processor, a tabulating card position sensing device associated with said processor, said position sensing device comprising support means adapted to support and guide said tabulating card while being processed in said processor, said support means including a plurality of apertures logitudinally aligned in the path of movement of said tabulating card, a plurality of fluid amplifiers each having at least one control signal inlet, and a plurality of fluid conduits each conduit connecting one of said apertures with one of said control signal inlets, means connected to each of said fluid conduits to supply each of said control signal inlets with a switching signal when said record passes the associated aperture.

4. A record position sensing mechanism, comprising in combination: means including a flat surface for supporting and guiding said record, said flat surface having an aperture disposed in the path of travel of said record, a fluid amplifier having an input channel, first and second output channels, a first source of fluid connected to said input channel normally directing a power stream through said first output channel, a control channel connected to said fluid amplifier adjacent said first output channel, a second source of fluid, conduit means communicating with said control channel and connected between said aperture and said second source of fluid providing a fluid signal in said control channel to switch said power stream from said first to said second output channels when said record covers said aperture.

References Cited by the Examiner

UNITED STATES PATENTS

| | | | |
|---|---|---|---|
| 2,563,290 | 8/51 | Thomas et al. | 235—61.11 |
| 2,900,130 | 8/59 | Lambert | 235—61.11 |

MALCOLM A. MORRISON, *Primary Examiner.*

DARYL W. COOK, LLOYD W. MASSEY, *Examiners.*